United States Patent
Andrews

(10) Patent No.: US 7,272,907 B1
(45) Date of Patent: Sep. 25, 2007

(54) METHOD OF ATTACHING A LEADER TO A SNELLED FLY

(76) Inventor: James S. Andrews, 20812 Vista Grande Dr., Austin, CO (US) 81410

( * ) Notice: Subject to any disclaimer, the term of this patent is extended or adjusted under 35 U.S.C. 154(b) by 0 days.

(21) Appl. No.: 11/412,393

(22) Filed: Apr. 28, 2006

(51) Int. Cl.
  *A01K 91/047* (2006.01)
(52) U.S. Cl. .......................... 43/4.5; 43/43.1; 43/44.85
(58) Field of Classification Search ............. 43/42.49, 43/43.12, 44.9, 43.1, 44.84, 44.85, 4.5, 44.83; 24/908; 289/1.5, 17
  See application file for complete search history.

(56) References Cited

U.S. PATENT DOCUMENTS

| | | | | |
|---|---|---|---|---|
| 2,196,620 A | * | 4/1940 | Attarian | 43/44.85 |
| 2,390,584 A | * | 12/1945 | Hardin | 43/44.85 |
| 2,636,305 A | * | 4/1953 | Shoenfelt | 43/43.1 |
| 2,851,816 A | * | 9/1958 | Gehrig | 43/43.1 |
| 3,023,535 A | * | 3/1962 | Holka et al. | 43/43.1 |
| 4,117,619 A | * | 10/1978 | Stevenson | 43/43.1 |
| 5,241,775 A | | 9/1993 | Matsumura | |
| 5,299,379 A | | 4/1994 | Hawk | |
| 5,899,014 A | | 5/1999 | Bornhoft et al. | |
| 6,485,065 B2 | | 11/2002 | Lusk et al. | |
| 6,760,997 B1 | | 7/2004 | Mammel | |

* cited by examiner

*Primary Examiner*—Kurt Rowan
(74) *Attorney, Agent, or Firm*—Crossley Patent Law; Mark Crossley

(57) ABSTRACT

A method of attaching a leader to a snelled fly by connecting a loop bearing a bead at the end of a leader to a snell loop at the end of a leader is disclosed. Generally the snell loop is first slipped over the beaded bead loop. Then, a length of the snell monofilament line is pulled through the bead loop. The snell loop and bead loop are simultaneously pulled in opposing directions forming a bead loop knot with said bead resting on one side of the knot. The process of detaching said knot is a simple reversal of the attachment process. The present method avoids the need of cutting a snell loop to replace a fishing fly and makes it possible to easily untie a loop-to-loop knot and avoid damaging a snell.

8 Claims, 6 Drawing Sheets

METHOD OF ATTACHING A LEADER TO A SNELLED FLY

BACKGROUND OF THE INVENTION

Fishing equipment varies widely and is designed to attract and capture specific species of fish found in various bodies of water. Fly fishing is one type of fishing which employs specialized fishing equipment. Fishhooks, fishing flies, and the line material vary from rather large to miniscule with fly size running from about 1.5 to 2 inches in length to 3/16 inch in length, line strengths from 20 pounds to 1 pound, and hook lengths from roughly 1¾ inch to 3/16 inch in length. A fishhook generally includes an eye to attach a fishing line. The eye of the hook is proportional to the size of wire used to make the hook, so that large, strong hooks have relatively large eyes and small, delicate hooks have relatively small eyes. It follows, therefore, that the smaller the fly, the more difficult and time consuming the task of threading the leader through the eye of the hook. Considering streamside conditions, limited eyesight; poor lighting environment; windy conditions; inclement weather; and limited manual dexterity exacerbate the difficulty of connecting a fishing leader to a fish fly. Hampered by poor eyesight and/or limited manual dexterity, the generally accepted solution to the aforementioned problems is to use a snelled fly and a loop-to-loop knot attachment to the leader. A snelled fly is a fly fitted with a relatively short length of monofilament line. The monofilament line is affixed to the fly on one end and with a loop on the opposite end. However, a loop-to-loop knot made from monofilament line is nearly impossible to untie. The loop-to-loop knot method of attaching a leader to a fly usually requires cutting the snell loop in order to replace the fishing fly. The present method makes it possible to easily untie a loop-to-loop knot and avoid damaging the snell.

FIELD OF INVENTION

The present invention relates to a method of attaching a leader to a snelled fly for use in fishing.

SUMMARY OF THE INVENTION

The present invention is to provide a method of attaching a leader to a snelled fly that overcomes the above-described problems with fly attachment methods, including the ability to easily attach a snelled fly to a leader and to easily detach a snelled fly without cutting the snell or the leader.

To fulfill this object, the method of the present invention utilizes a small bead threaded on the loop of a leader. When using a loop-to-loop knot to attach a snelled fly, the bead functions to prevent the monofilament loops from locking and, hence, permits untying of the loop-to-loop knot with minimal effort and no damage to the leader or the snelled fly. The primary objective of the said bead loop knot method is to provide a means whereby a snelled fly may be easily detached from a leader. Using the present method, the snell loop is slipped over the bead loop. Then, the proximal end of the snell is pulled upward through the aperture in the bead loop and over the bead. The leader and snell are then pulled in opposing directions to form a taut and complete bead loop knot. A person with limited visual acuity or limited manual dexterity is thus able to attach a leader to a snelled fly.

The untying of the bead loop knot to release and replace a fly using the present method is simple and does not consume much time. To untie the bead loop knot, a user grasps the snell in one hand and the terminal end of the leader with the other hand and pulls in opposing directions, causing the bead to project away form the line of the snell and the leader, as per FIG. 5. The user then grasps the bead in one hand and with the other hand lifts the snell upward and away from the bead to provide an open space between the bead and the snell to allow the free end of the snell to be inserted downward through the opening in reverse order of FIG. 3. The snell loop is then slipped off the bead loop in reserve order of FIG. 2.

An object of the present method of attaching a leader to a snelled fly is to provide an improved way of attaching a fly to a leader.

Another object of the present method of attaching a leader to a snelled fly is to provide an easy way to attach a leader to a snelled fly.

Yet another object of the present method of attaching a leader to a snelled fly is to provide a less time consuming way to attach a leader to a snelled fly.

Still another object of the present method is to reduce the difficulty of connecting a fishing fly to a leader for fishermen having limited eyesight.

It is another object of the present method to reduce the difficulty of connecting a fishing fly to a leader in poor lighting conditions or during windy or inclement weather.

Yet even another object of the present method is to reduce the difficulty of connecting a fishing fly to a leader for fishermen having limited manual dexterity when compared to previous methods of attaching a fishing fly to a leader.

Avoidance of the need to cut, replace, and waste fly line and leaders in order to replace a fishing fly is still another object of the present method.

Thus has been broadly outlined the more important features of the present method of attaching a leader to a snelled fly so that the detailed description thereof that follows may be better understood and in order that the present contribution to the art may be better appreciated.

Numerous objects, features, and advantages of the present method of attaching a leader to a snelled fly will be readily apparent to those of ordinary skill in the art upon reading the following detailed description of presently preferred, but nonetheless illustrative, examples of the present method of attaching a leader to a snelled fly when taken in conjunction with the accompanying drawings. In this respect, before explaining the current examples of the present method of attaching a leader to a snelled fly in detail, it is to be understood that the invention is capable of other examples and of being practiced and carried out in various ways. It is also to be understood that the phraseology and terminology employed herein are for the purpose of description and should not be regarded as limiting.

Those skilled in the art will appreciate that the conception upon which this disclosure is based may readily be utilized as a basis for the design of other structures, methods and systems for carrying out the several purposes of the present method of attaching a leader to a snelled fly. It is therefore important that the claims be regarded as including such equivalent constructions insofar as they do not depart form the spirit and scope of the present invention.

Objects of the method of attaching a leader to a snelled fly, along with various novel features that characterize the invention are particularly pointed out in the claims forming a part of this disclosure. For better understanding of the method of attaching a leader to a snelled fly, its operating advantages and specific objects attained by its uses, refer to the accompanying drawings and description.

DETAILED DESCRIPTION OF THE DRAWINGS

In discussing various aspects of the present method of attaching a fishing leader to a snelled fly, representations of the bead knot loop method are shown as elements in the figures. These representations of bead knot loop elements are understood to encompass a wide variety of materials of the general type described or represented and is not intended to limit the invention to any particular model or specific type. Further, the representations are not intended to limit the elements to any particular size, weight, or the like.

Figure 1:
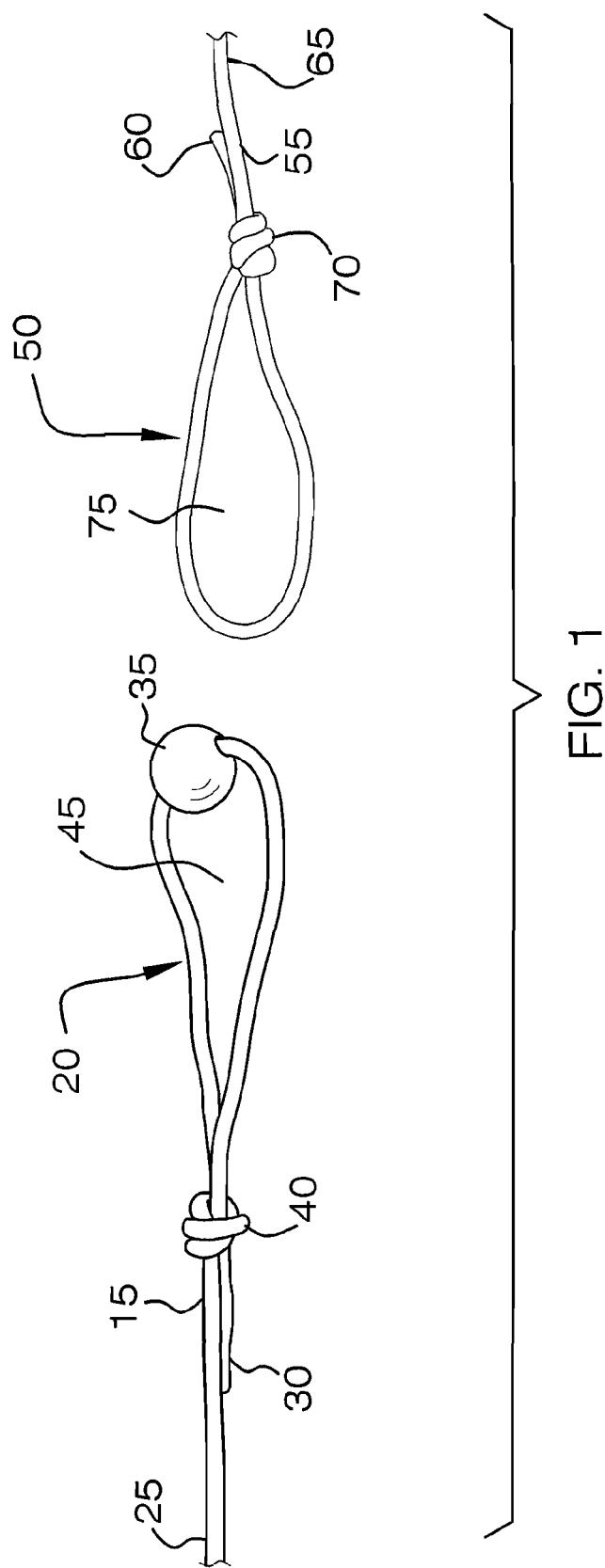
FIG. 1 is a perspective view of a bead loop with a bead (shown on the left) and a snell loop (shown on the right).

With reference now to the drawings, and particular FIGS. 1 through 5 thereof, various steps in tying a bead loop knot 10 (shown in FIG. 4) in accordance with the present method are illustrated. FIG. 1 depicts a leader 15 comprised of a first end 25 and a terminal end 30. Said first end 25 leads ultimately to a fishing rod. A bead loop 20 (shown on the left) is formed from the terminal end 30 of said leader 15 by threading a bead 25 onto the terminal end 30 of said leader 15 and then forming first knot 40 as shown in FIG. 1. Said bead may be of a size in a range from one-eighth inch (⅛") to one-fourth inch (¼") in diameter depending upon a user's personal preference. Furthermore, a small piece of plastic tubing of a size in a range from one-eighth inch (⅛") to one-fourth inch (¼") length and diameter depending upon a user's personal preference may be substituted for said bead. A generally circular aperture 45 is formed in the middle of said bead loop 20. Said leader 15 may be passed through said bead 25 twice to maintain more secure bead position.

A snell loop 50 (shown on the right) is formed with a second knot 70 at the end of a snell monofilament line 55 opposite from the proximal end 65 of a snell 60 which leads to a fly (not shown). A generally circular opening 75 is formed in the middle of said snell loop 50. A typical snell loop known in the art is shown in the right.

Figure 2:
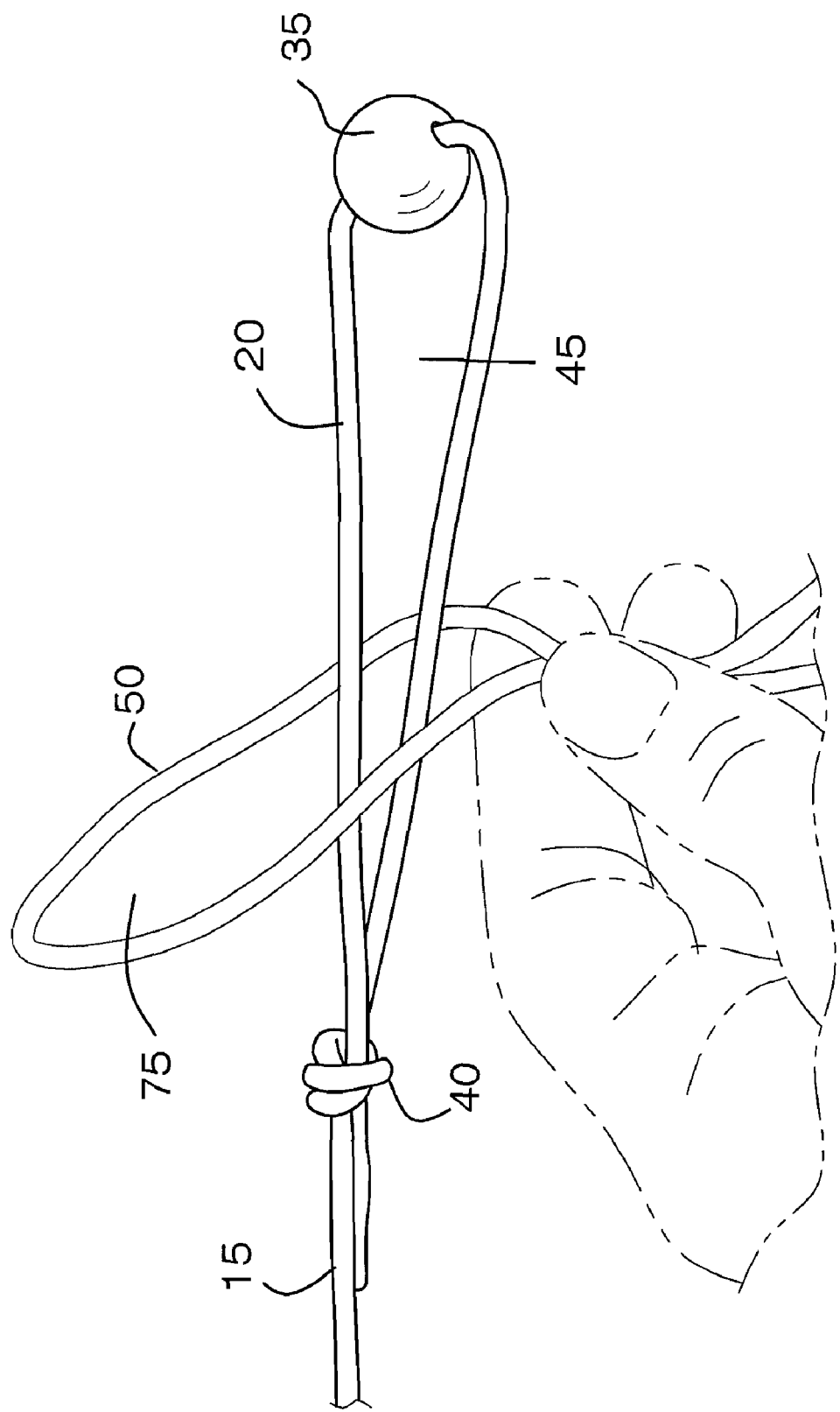
FIG. 2 illustrates a snell loop slipped over a bead loop as a step of practicing the present method.

To begin the process of attaching a leader 15 to a snelled fly (not shown), using an opening 75 of a snell loop 50, said snell loop 50 is slipped over a bead loop 20 toward first knot 40 so that a bead 35 remains free and said an aperture 45 of said bead loop 20 remains open as shown in FIG. 2.

Figure 3:
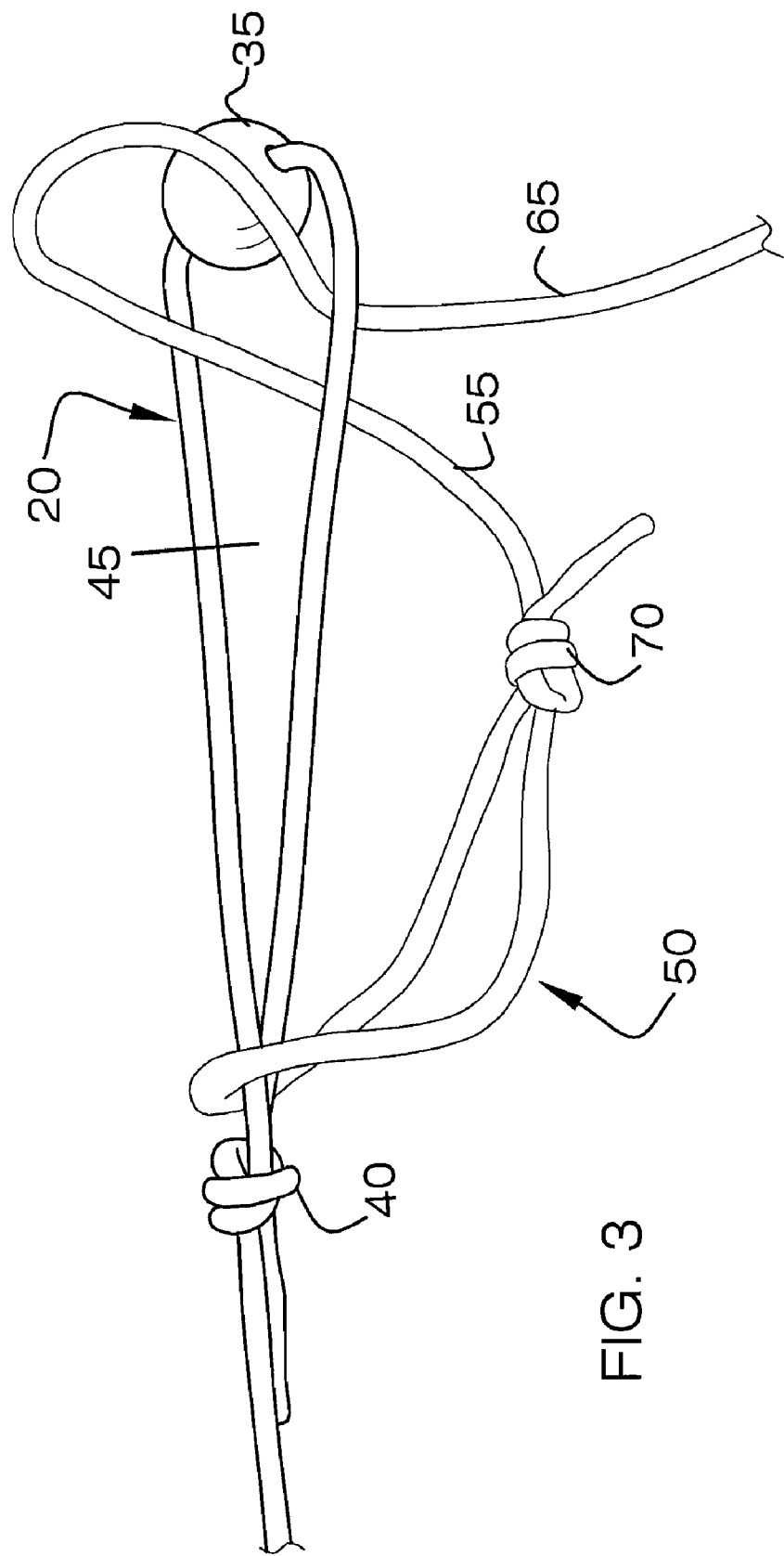
FIG. 3 illustrates a snell and fly being fed through a bead loop as another step of practicing the present method.

A next step in the present method of attaching a snelled fly (not shown) to a leader 15 is shown in FIG. 3. FIG. 3 illustrates that once a snell loop 50 is slipped over a bead loop 20 toward first knot 40, second knot 70 lies below said bead loop 20. A user then continues the method of attaching a leader 15 to a snelled fly by pulling a portion of the proximal end 65 of said snell monofilament line 55 upward through the opening of a said bead loop 20.

Figure 4:
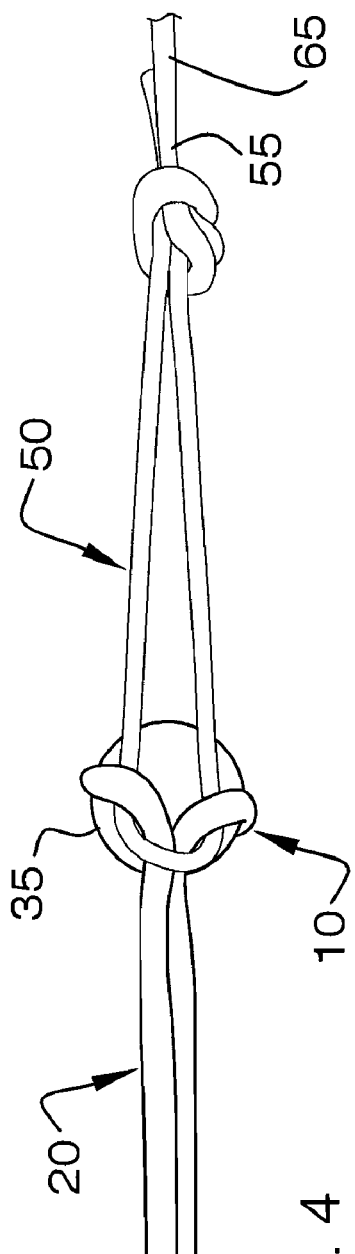
FIG. 4 is a bottom plan view illustrating a snell loop and bead loop pulled in opposing directions to complete a bead loop knot as a step of practicing the present method.
Figure 5:
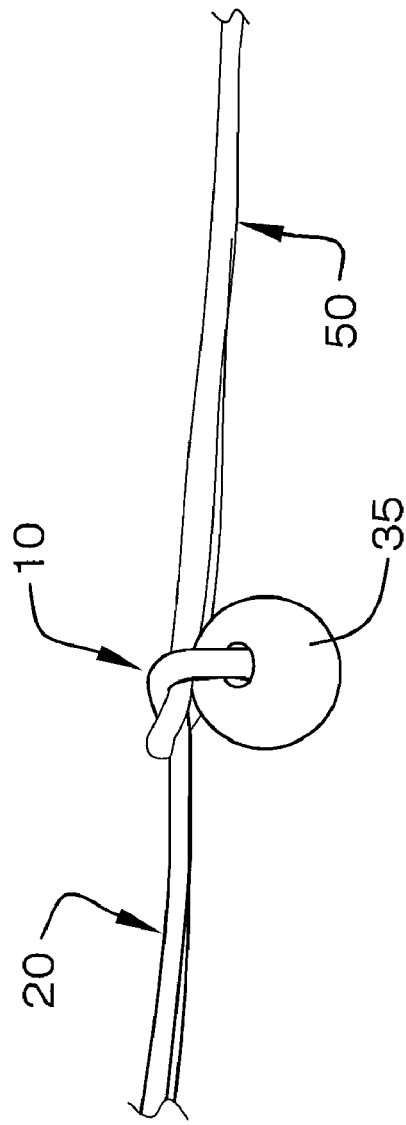
FIG. 5 is a side elevation view illustrating a completed bead loop knot.

The next step in the present method is shown in FIGS. 4 and 5. A user further proceeds by simultaneously pulling the proximal end 65 of said snell monofilament line 55 and said bead loop 20 in opposing directions so that said bead loop 20 and said snell loop 50 form a taut bead loop knot 10 with said bead 35 located on one side of said bead loop knot 10. At this point, said bead 35 prevents intimate contact with the monofilament, hence allowing a bead loop knot to be easily untied.

FIG. 5 is a side elevation view illustrating a completed bead loop knot 10.

Figure 6:
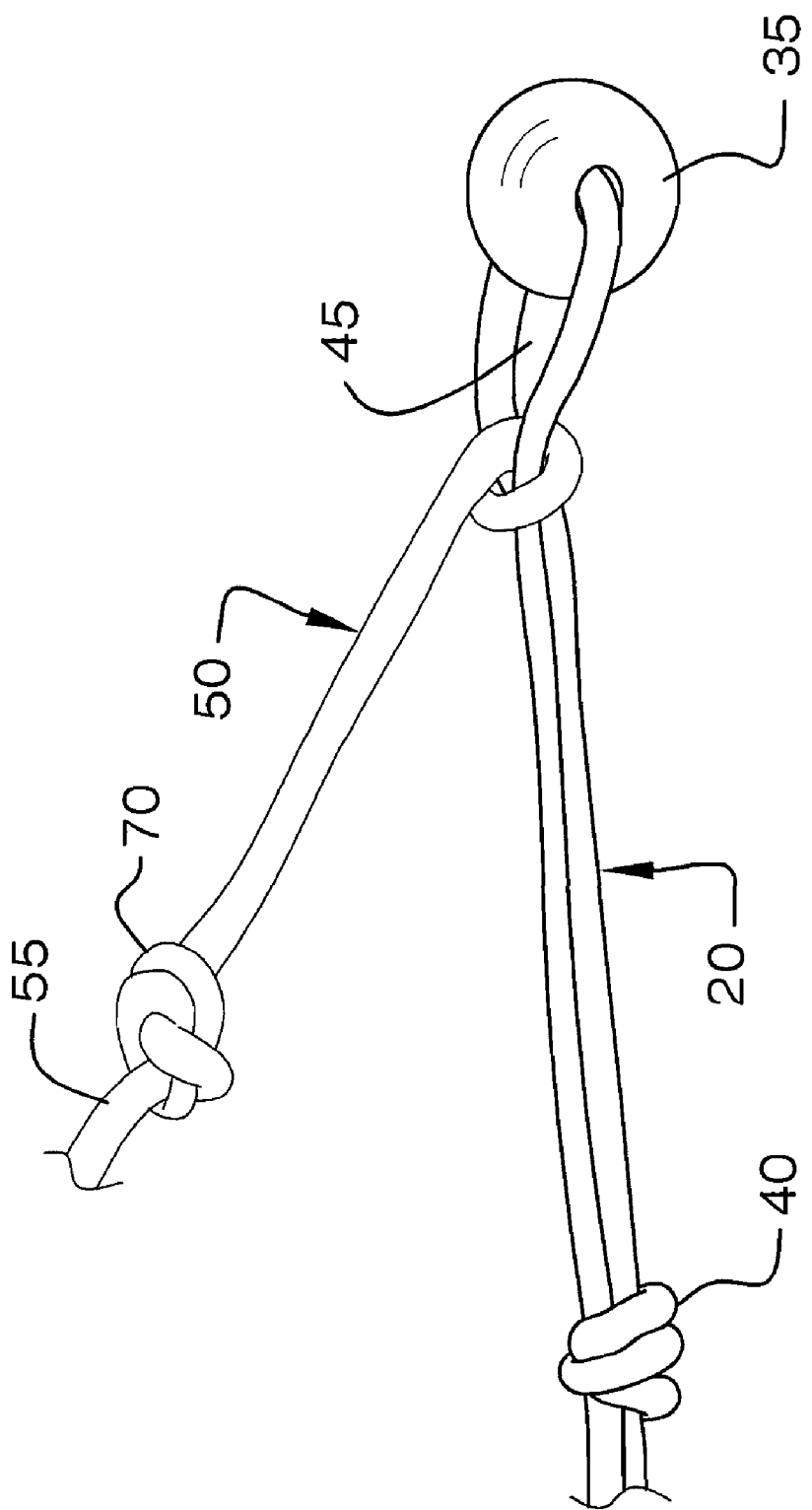
FIG. 6 is a perspective view of a step of practicing the present method by untying a completed bead loop knot.
Figure 7:
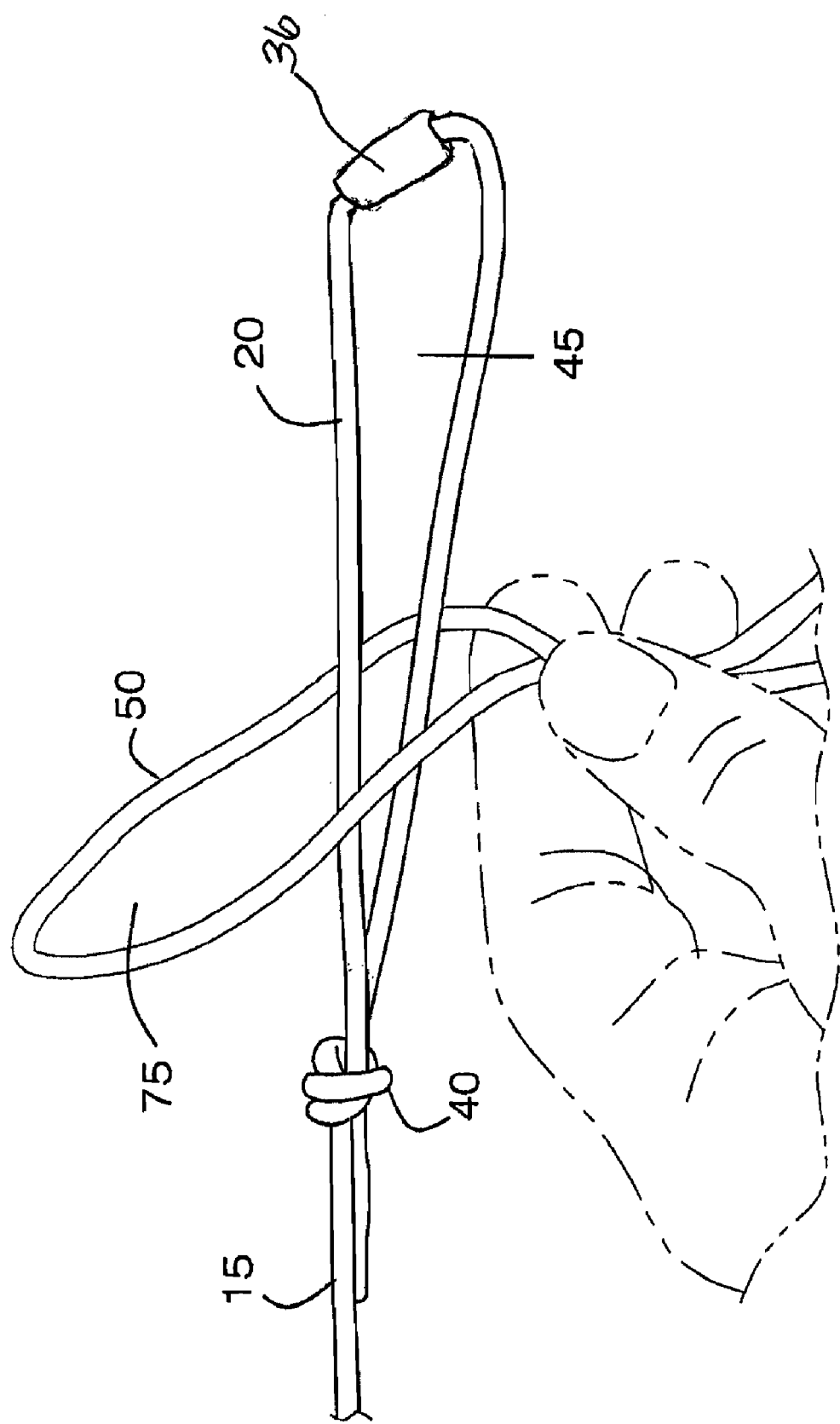
FIG. 7 illustrates a snell loop slipped over a plastic tubing loop as a step of practicing the present method.

FIG. 6 illustrates the first step in untying a bead loop knot 10 in accordance with the present method. A user grasps bead 35 in one hand and the snell monofilament line 55 with the other hand and pulls said bead 35 and said snell monofilament line 55 in opposing directions, thus causing said bead 35 to project away from said snell monofilament line 55. The user then grasps the bead 35 in one hand and with the other hand lifts the snell 60 upwardly and away from said bead 35 to provide an open space between the bead 35 and the snell 60 to allow the snell monofilament line 55 to be inserted downwardly through the aperture 45 in reverse order of FIG. 3. The snell loop 50 is then slipped off the bead loop 20 in reverse order from the order shown in FIG. 2.

With respect to the above description then, it is to be realized that the present method of attaching a leader to a snelled fly to include variations in the matter of operation, assembly and use, is deemed readily apparent and obvious to one skilled in the art, and all equivalent relationships to those illustrated in the drawings and described in the specification are intended to be encompassed by the present invention.

Directional terms such as "front", "back", "upward", "downward" and the like may have been used in the description. These terms are applicable to the examples shown and described in conjunction with the drawings. The foregoing is considered as illustrative only of the principles of the invention. Further, since modifications and changes will readily occur to those skilled in the art, it is not desired to limit the present method to the exact operation shown and described, and accordingly, all suitable modifications and equivalents may be resorted to, falling within the scope of the present method.

What is claimed is:

1. A method of attaching a leader to a snelled fly, comprising:
   a. providing a length of said leader having a first end and a terminal end;
   b. threading a bead near said terminal end of said leader;
   c. forming a first knot with said terminal end of said leader, whereby a bead loop bearing said bead is formed and whereby a generally circular aperture in the center of said bead loop is further formed;
   d. providing a length of snell monofilament line having a distal end and a proximal end;
   e. forming a second knot near a distal end of said snell monofilament line, whereby a snell loop is formed and whereby a generally circular opening is further formed;
   f. slipping said snell loop over said bead loop and sliding said snell loop toward said first knot, whereby said aperture remains open;
   g. slipping a length of the proximal end of said snell monofilament line upwardly through said aperature and toward said bead, while said second knot remains below said bead loop, whereby a loop is formed with said length of snell monofilament line, said loop being approximately the same size as said bead loop; and h. simultaneously pulling said proximal end of said snell monofilament line and said bead loop in opposing directions whereby a taut bead loop knot is completed.

2. The method of claim 1 further comprising:

a. pulling on said leader against said snell loop with one hand while simultaneously grasping said bead with the other hand and lifting said leader upwardly and toward said first knot;

b. feeding said leader downwardly through said aperture in said bead loop so that said snell loop is looped over said bead loop; and c. slipping said snell loop off of said bead loop.

3. The method in claim 1 wherein said bead may be a size in a range from one-eighth inch (⅛") to one-fourth inch (¼") in diameter.

4. The method in claim 1 wherein a piece of plastic tubing of a size in a range from one-eighth inch (⅛") to one-fourth inch (¼") in length and diameter may be substituted for said bead.

5. A method for attaching a snelled fly to a leader comprising the following steps:

a. threading a bead onto a leader with a terminal end of said leader extending beyond said bead;

b. tying a knot to form a bead loop wherein said bead is captured in a loop of sufficient size to admit passage of the largest size fly anticipated by a user;

c. holding a bead loop in one hand and a snell loop in the other hand;

d. slipping the snell loop over said bead loop such that said snell loop passes over said bead, said snell loop does not extend beyond a knot forming said bead loop, an aperture located in said bead loop remains open, and a knot forming said snell loop lies below said bead loop;

e. grasping a length of snell monofilament line and feeding said length of snell monofilament line upwardly through the aperture located in said bead loop such that the length of snell monofilament line forms a loop approximately the same size as the snell loop; and f. simultaneously pulling a leader and said snell monofilament line in opposite directions.

6. The method of claim 5 further comprising the following steps:

a. grasping said snell in one hand and a terminal end of said leader with the other hand;

b. pulling said snell and terminal end of said leader in opposing directions, thus causing said bead to project away from a snell monofilament line and leader;

c. grasping said bead in one hand and with the other hand lifting said snell upwardly and away from said bead to provide an open space between said bead and said snell;

d. feeding said snell monofilament line downwardly through said bead loop; and e. slipping said snell loop off said bead loop to complete detachment.

7. The method in claim 5 wherein said bead may be a size in a range from one-eighth inch (⅛") to one-fourth inch (¼") in diameter.

8. The method in claim 5 wherein a piece of plastic tubing in a size in a range from one-eighth inch (⅛") to one-fourth inch (¼") in length and diameter may be substituted for said bead.

\* \* \* \* \*